United States Patent [19]

Bassa et al.

[11] Patent Number: 4,944,955
[45] Date of Patent: Jul. 31, 1990

[54] MICROWAVABLE, UNCOOKED STARCH-CONTAINING, DRY MIXES

[75] Inventors: Ivette A. Bassa, East Windsor; Joseph P. Destephano, Mt. Laurel; Jay H. Katcher, Cranbury; Robert E. Schara, Princeton Junction, all of N.J.

[73] Assignee: Kraft General Foods, Inc., Glenview, Ill.

[21] Appl. No.: 281,118

[22] Filed: Dec. 7, 1988

[51] Int. Cl.$^5$ .............................................. A23L 1/187
[52] U.S. Cl. .................................... 426/579; 426/243; 426/573; 426/661
[58] Field of Search ............... 426/573, 578, 579, 243, 426/661

[56] References Cited

U.S. PATENT DOCUMENTS

| | | |
|---|---|---|
| 3,619,208 | 11/1971 | Bahoshy et al. .................... 426/579 |
| 3,619,209 | 11/1971 | Hegadorn et al. ................... 426/579 |
| 4,187,326 | 2/1980 | Serafino et al. ...................... 126/590 |
| 4,280,851 | 7/1981 | Pitchon et al. ......................... 127/33 |
| 4,361,592 | 11/1982 | Carpenter et al. .................. 426/579 |
| 4,438,148 | 3/1984 | O'Rourke et al. ................... 426/579 |
| 4,469,712 | 9/1984 | Katcher et al. ...................... 426/579 |
| 4,477,480 | 10/1984 | Seidel et al. ......................... 426/578 |
| 4,565,708 | 1/1986 | Blake et al. .......................... 426/579 |
| 4,695,474 | 9/1987 | Cuneo et al. ......................... 426/579 |

OTHER PUBLICATIONS

Zallie, J. P. "The Role and Function of Starches in Microwavable Food Formations" 3/88, pp. 29-34.

Primary Examiner—Donald E. Czaja
Assistant Examiner—Evan Federman
Attorney, Agent, or Firm—Thomas R. Savoie; Daniel J. Donovan

[57] ABSTRACT

A dry cooked pudding mix which can be prepared in a microwave oven without stirring during the cooking step, said mix containing sweetener, uncooked starch, spray-cooked and dried pregelatinized starch, dispersant and a cool-water soluble hydrocolloid gum. The pregelatinized starch has a critical particle size distribution wherein at least 30%, preferably at least 60%, by weight of the starch is retained on a 270 U.S. Standard Sieve and no more than 1% by weight is retained on an 80 U.S. Standard Sieve.

13 Claims, No Drawings

MICROWAVABLE, UNCOOKED STARCH-CONTAINING, DRY MIXES

BACKGROUND OF THE INVENTION

Dry mixes containing uncooked starch, such as mixes for producing cooked puddings, are well-known in the art. Examples of such mixes are set forth in Bahoshy, et al. U.S. Pat. No. 3,615,208 and Hegadorn, et al. U.S. Pat. No. 3,619,209. Dry mixes containing cooked or pregelatinized starches, such as instant pudding mixes, are also well known in the art. Examples of these instant pudding mixes are set forth in Carpenter, et al U.S. Pat. No. 4,361,592 and O'Rourke, et al U.S. Pat. No. 4,438,148.

Instant mixes, such as instant pudding mixes have become increasingly popular due to the convenience such mixes offer consumers. These mixes merely have to be mixed with an aqueous fluid, such as cold water or milk, and allowed to set. Despite the convenience offered by instant mixes, many consumers prefer the texture obtained from uncooked, starch-containing mixes.

Uncooked starch-containing dry mixes, such as mixes for producing cooked puddings, have to be mixed with milk and/or water, brought to a boil and then allowed to set or cool. It is, however, also necessary to stir the aqueous mixture during cooking so that the starch remains in suspension and a uniform starch gel or slurry is obtained. The necessity to stir during cooking makes microwave cooking of these uncooked starch-containing mixes not particularly convenient. Common usage of microwave ovens is to merely place the food in the oven for a certain period of time. Having to remove the food from the oven several times during the cooking period to effect stirring greatly defeats the convenience factor normally associated with microwave cooking.

It is seen as desirable to produce an uncooked starch-containing, dry mix which can be mixed with milk and/or water and cooked in a microwave oven without the necessity to intermittently stir the mixture during cooking. Such a product would not only offer the consumer a convenient method of preparation, comparable to the one-step preparation method of instant pudding mixes, but would also produce the cooked-starch texture, gel structure/viscosity and taste which is sought by many consumers.

DESCRIPTION OF THE INVENTION

This invention will be described in terms of a dry, cooked pudding mix; however, other uncooked starch-containing mixes, such as sauces, gravies, custards and the like are also within the scope of this invention.

Conventional dry, cooked pudding mixes depend on cook-up (i.e., raw or ungelatinized) starches both to build viscosity and to provide a short, smooth-textured gel structure. Cook-up starches, however, do not hydrate and build viscosity until they have reached a temperature of about 160° F. (71.1° C.). Such a delay in viscosity build-up will result in a settling of dispersed ingredients unless the aqueous dispersion is being stirred during the heating step. While it is known to include rapidly-hydratable hydrocolloids, such as xanthan gum or carrageenan, or phosphate salt setting systems, in order to quickly build viscosity in aqueous dispersions, it has not previously been found desirable to utilize pregelatinized starch material for quickly building viscosity in a product which is to have a smooth, creamy texture, such as pudding.

The use of pregelatinized starches in instant food products, such as dry instant pudding mixes, has been limited to fine grind starches, such as described in Carpenter, et al. U.S. Pat. No. 4,361,592 and O'Rourke, et al. U.S. Pat. No. 4,438,148. Finely ground pregelatinized starch was found to be necessary in order to avoid a grainy texture in the prepared food product. However, fine grind starch itself presents a problem in that this material is difficult to disperse.

It has now been found that spray-cooked and dried, pregelatinized starch, having a relatively-coarse particle size, is useful as a means to quickly and readily provide viscosity when an uncooked starch-containing dry mix product is blended with milk or water. According to this invention, a spray-cooked and dried, pregelatinized starch, having a particle size distribution wherein at least 30%, preferably at least 60%, by weight of the starch is retained on a 270 U.S. Standard Sieve (53 microns) and no more than 1% by weight of the starch is retained on an 80 U.S. Standard Sieve (177 microns), is utilized as a quick viscosity building component in a dry, packaged food mix which contains more than about 10% by weight of ungelatinized starch. Most preferably, essentially all of the spray-cooked and dried pregelatinized starch material is between 80 and 270 U.S. Standard Sieve.

It is believed that relatively-coarse, spray-cooked and dried, preglatinized starch material quickly disperses in an aqueous medium, even with minor agitation, such as would be encountered with fork stirring, and separates into swollen free starch granules and agglomerates. During cooking, the spray-cooked and dried starch breaks down to molecular starch and swollen starch granules. This separation and break down of the spray-dried starch material appears to be due to a porous structure which exists within the spray-cooked and dried particles. Comparably-sized particles of drum-dried, pregelatinized starch do not, as a result of stirring and cooking, disperse to yield molecular starch and swollen starch granules and are not useful in this invention.

According to one embodiment of this invention, a cooked pudding mix is prepared which contains from about 50 to 80% by weight carbohydrate sweetening and/or bulking agents, 8 to 20% by weight uncooked starch and from 12 to 20% by weight of spray-cooked and dried, pregelatinized starch. Preferably, the mix will contain a minor amount (less than 1.5% by weight) of a dispersant, such as mono and/or diglycerides, polysorbate 60, lecithin and the like. A cold-water dispersible hydrocolloid gum, such as xanthan gum or kappa carrageenan, is also included in the mix at a level of from 0.015 to 1% by weight to enhance suspension of uncooked starch particles during microwave cooking and to add viscosity and gel structure to the final product.

Other functional ingredients, such as flavor agents, color agents, emulsifiers, anti-caking agents, anti-flow agents and the like, may also be included in the dry mix.

As a substitute for all or a portion of the carbohydrate sweetening and/or bulking agents, it would of course be possible to use an intensive sweetener which would be present at only a low level by weight of the mix. For products when a sweet taste is not desired the absence of any sweetening and/or bulking agent may be appropriate.

Ranges (weight %) for ingredients for the dry mixes made in accordance with this invention could be from 0 to 80% sweetening and/or bulking agents, 12 to 80% of the pregelatinized spray-cooked and dried starch, 8 to 40% uncooked starch, 0.1 to 2% dispersant and 0.015 to 3% hydrocolloid gum. The weight ratio of spray-cooked and dried pregelatinized starch to uncooked starch should be 1.5 to 2.5:1, preferably 1.7 to 2.0:1.

Sweetening agents may include sugars, such as sucrose, dextrose and fructose, sugar alcohols, such as sorbitol and mannitol, intensive sweeteners, such as aspartame, saccharin and acesulfame, and hydrolyzed starch solids, such as dextrose and corn syrup solids. Bulking agents, such as maltodextrin, polydextrose, alpha cellulose, microcrystalline cellulose, may also be included in the dry mix, usually in combination with an intensive sweetener, for producing low-calorie products.

The uncooked starch material should be a relatively bland-flavored starch, such as tapioca starch, waxy maize starch or deflavored corn starch and the like. All or a portion of this starch may be modified (i.e., cross-linked and/or hydroxypropylated) in order to improve the properties of the starch.

The relatively-coarse, spray-cooked and dried, pregelatinized starch must be a cold-water swelling starch which has good dispersibility. This material may be derived from tapioca, waxy maize, corn starch and the like. This dried starch is prepared in accordance with Pitchon, et al. U.S. Pat. No. 4,280,851 which is hereby incorporated by reference. According to this process, an aqueous starch slurry is sprayed through an atomization aperture in the nozzle. A heating medium (e.g., steam) is injected through other apertures in the nozzle and into the spray of atomized the starch slurry so as to heat the starch to a temperature which is effective to gelatinize the starch. An enclosed chamber surrounds the atomization and heating medium injection apertures and defines a vent aperture which is positioned to enable the heated, atomized starch spray to exit the chamber. The chamber is sized such that the elapsed time for passage of the spray droplets through the chamber (i.e., from the atomization aperture through the vent aperture) is sufficient to effect gelatinization of the starch. Various sizing, classifying and/or screening techniques can be employed, as needed, in order to isolate the desired starch material.

In the case of corn starch it will be preferred to utilize hydroxproplylated corn starch in order to obtain enhanced cooking within the nozzle cooking chamber. Hydroxypropylation techniques are well-known in the art; an example of one such process is set forth in Leusner, et al. U.S. Pat. No. 4,431,800 which patent is hereby incorporated by reference. Cross-linking of the starch is also preferred in order to give the starch tolerance during cooking and to enhance texture.

The dry mixes of this invention are prepared using conventional mixing techniques. The dispersant should be evenly distributed throughout the dry mix so as to most effectively enable the dry mix to disperse in an aqueous medium such as cold milk. Even distribution may be effected by dry blending the dispersant with or coating the dispersant onto a major constituent of the dry mix (e.g, sugar in sugar-sweetened pudding mixes) and subsequently dry blending the remaining ingredients with this pre-blend.

This invention is further illustrated but not limited by the following examples.

EXAMPLE 1

(Chocolate Pudding Mix)

EXAMPLE 1

| (CHOCOLATE PUDDING MIX) | |
|---|---|
| Ingredient | % by Weight |
| Sucrose | 60.6 |
| Pregelatinized, Spray-Cooked & Dried Corn Starch (hydroxypropylated and cross-linked) | 16.1 |
| Cocoa | 12.3 |
| Modified, Uncooked Corn Starch (deflavored) | 8.6 |
| Functional Ingredients (flavors, colors, dispersants, flow agents | 2.1 |

The dry pudding mix was prepared by dry blending the sucrose and the dispersants. Thereafter, the remaining ingredients were dry-blended. The granulation on the spray-dried corn starch was less than 1%, plus 80 U.S. mesh, less than 35%, plus 120 U.S. mesh and greater than 60%, plus 270 U.S. mesh.

EXAMPLE 2

(Vanilla Pudding Mix)

EXAMPLE 2

| (VANILLA PUDDING MIX) | |
|---|---|
| Ingredient | % by Weight |
| Sucrose | 70.0 |
| Pregelatinized Starch (from Ex. 1) | 18.0 |
| Modified, Uncooked Corn Starch (deflavored) | 10.0 |
| Functional Ingredients (flavors, colors, disperants, flow agents | 1.65 |

The dry pudding mix was prepared by blending the sucrose and the dispersant and, thereafter, dry-blending the remaining ingredients.

EXAMPLE 3

Cooked puddings were prepared in glass bowls, using the dry mix of Examples 1 and 2, by adding 92.7 grams of the chocolate pudding mix or 84.8 grams of the vanilla pudding mix to two cups (473 ml) of cold milk. After stirring for about one minute, the bowl was placed in a microwave at high power for five minutes. The cooked pudding was then stirred well in order to disperse the skin which formed on the top of the pudding and to eliminate any temperature gradients that might be present as a result of microwave cooking. The pudding was then poured into four dessert dishes and chilled in a refrigerator for about two hours. The resulting puddings had a smooth, creamy texture equivalent to a stove-top cooked pudding.

Having thus described the invention, what is claimed is:

1. A dry, food mix which is suitable for both microwave or stovetop preparation by mixing with milk or water and, cooking, said mix comprised of:
   (a) up to 80% by weight of sweetening agents, bulking agents or combinations thereof,
   (b) 12 to 80% by weight of spray-cooked and dried pregelatinized starch, having a particle size distribution herein at least 30% by weight of the starch is retained on a 270 U.S. Standard Sieve and no more than 1% by weight is retained on an 80 U.S. Standard Sieve;

(c) 8 to 40% by weight uncooked starch, wherein the weight ratio of the pregelatinized starch to cooked starch is 1.5 to 2.5:1;

(d) dispersant in an amount of 0.1 to 2% by weight; and (e) a cold-water dispersible hydrocolloid gum in an amount of from 0.015 to 3% by weight.

2. A dry, cooked pudding mix in accordance with claim 1 which contains from 50 to 80% sweetening agents, bulking agents or combinations thereof, from 8 to 20 uncooked starch, from 12 to 20% spray-cooked and dried, pregelatinized starch, from 0.1 to 1.5% dispersant and from 0.015 to 1% gums.

3. The pudding mix of claim 2 which contains from 50 to 80% sugars.

4. The mix of claim 1 wherein the dispersant is blended with at least a portion of the sugar and this pre-blend is mixed with the remaining dry ingredients.

5. The mix of claim 1 wherein the gum is comprised of kappa carrageenan.

6. The mix of claim 1 wherein the uncooked starch is deflavored corn starch.

7. The mix of claim 1 wherein the pregelatinized starch is a hydroxypropylated and cross-linked starch.

8. The pudding mix of claim 1 wherein the ratio of pregelatinized starch to cooked starch is from 1.7 to 2.0:1.

9. The mix of claim 1 wherein at least 60% by weight of the pregelatinized starch is retained on a 270 U.S. Standard Sieve.

10. The mix of claim 1 wherein less than 3.5 of the pregelatinized starch is retained on a 120 U.S. Standard Sieve.

11. The mix of claim 1 wherein essentially all of the pregelatinized starch is between 80 and 270 U.S. Standard Sieves.

12. The mix of claim 1 wherein at least a portion of the uncooked starch is a modified starch.

13. The mix of claim 7 wherein at least a portion of the pregelatinized starch is a deflavored corn starch.

* * * * *